Patented Mar. 5, 1935

1,993,431

UNITED STATES PATENT OFFICE 1,993,431

SOLID SALTS OF HIGHER MOLECULAR ALKYL SULPHURIC ACIDS

Heinrich Bertsch, Chemnitz, Germany, assignor to the firm H. Th. Böhme Aktiengesellschaft, Chemnitz, Germany No Drawing. Application September 5, 1933, Serial No. 688,259

23 Claims. (Cl. 260—99.12)

This invention relates to a process for the production of solid salts of the higher molecular alkyl sulphuric acids.

Repeated attempts have already been made to produce pure salts of higher molecular alkyl sulphuric acids in solid form. In particular these attempts had as their objective alkyl sulphuric acid compounds derived from higher fatty acids such as, for example, the so-called ricinoleic sulphuric acid ester, which, as is known, constitutes one of the most important constituents of Turkey red oil. In these attempts the neutralization of the fat-sulphuric acid compounds, obtained by the sulphonation of castor oil in known manner, was usually effected by the addition of aqueous alkali solutions. Thereby, however, the salts always separated out in the form of oily greasy masses which stubbornly resisted all attempts at further separation and purification.

Attempts have also been made to neutralize with alcoholic soda lye and it is in this way that success in producing the pure sodium salt of ricinoleic sulphuric acid ester was first attained. However this method of manufacture is also, to any important extent, completely unserviceable since resinification and darkening of the products very easily take place. The raw sulphation product neutralized by means of soda lye yields a jelly-like mass containing a sodium salt of ricinoleic sulphuric acid ester mixed with Glauber's salt. It is exceedingly difficult when operating on a commercial scale to separate and purify this sodium salt.

According to this invention there has been found a method which is quite generally applicable to higher molecular alkyl sulphuric acids having more than nine carbon atoms and which enables the salts of the alkyl sulphuric acids, in particular their alkali metal salts, to be prepared in a pure solid form.

The process is particularly suitable for the products of solid salts from the sulphuric acid derivatives derived from unsaturated hydrocarbons, alcohols, fatty acids, fatty acid esters, fatty acid amides and analogous compounds, in brief for the sulphuric acid compounds of those aliphatic compounds, which yield alkyl sulphuric acids or analogous compounds with sulphonating or sulphating agents, such as anhydrous sulphuric acid, sulphur trioxide, chlorsulphonic acid etc.

The process of this invention consists essentially in effecting the neutralization of the sulphated or sulphonated mixture by the addition of organic or inorganic bases in suitable form with the exclusion of water or alcohol as solvents. The aliphatic compound serving as initial material is treated with sulphuric acid or other agent, if desired in the presence of an inert solvent. Preferably sulphating or sulphonating agents such as, for example, sulphur trioxide or chlorsulphonic acid, which yield no water in the reaction, are employed.

After the sulphation or sulphonation is finished the anhydrous base is added in solid, liquid or gaseous form. The salts of the alkyl sulphuric acids separate out in solid form mixed with small quantities of other salts. These products without further purification can be employed, for most purposes, for example the processes of the textile finishing and leather industries, the production of emulsions, and the like. If the production of absolutely pure products is desired, as for example for the purposes of the pharmaceutical industry, the crude product is recrystallized one or more times from, for example, absolute alcohol. In this way for example the alkali metal salts of ricinoleic sulphuric acid ester are obtained in perfectly pure form as colourless powders.

Example 1

27 kgms. of stearyl alcohol are dissolved in 60 kgms. of trichlorethylene and sulphated with 12 kgms. or chlorsulphonic acid at 50–60° C. The product is neutralized by introducing gaseous ammonia. On cooling the mass solidifies. It is freed from trichlorethylene by expression and drying. The ammonium salt of octadecyl sulphuric acid ester thus obtained is almost pure white. By a single recrystallization from absolute alcohol it is completely freed from inorganic salts. The finished product is a snow white powder having the formula $CH_3—(CH_2)_{16}—CH_2OSO_3—NH_4$.

Example 2

30 kgms. of ricinoleic acid are dissolved in 90 kgms. of ethyl ether and sulphated with 11.6 kgms. of chlorsulphonic acid at minus 10 to 5° C. The greater part of the hydrogen chloride evolved is removed by leading a stream of carbon dioxide through the sulphonation mixture. Thereafter the mass is neutralized with 14 kgms. of calcined soda, anhydrous sodium carbonate or sodium carbonate which has been subjected to heating in a calcining furnace. The precipitated solid sodium salt of ricinoleic sulphuric acid is filtered by suctional filtration and dried. It is obtained free from inorganic salts by one recrystallization from absolute alcohol, has a snow while colour and is obtained almost analytically pure. The product may have a formula of $CH_3.(CH_2)_5.CH(OSO_3Na).(CH_2)_2.CH(OSO_3Na).-$
$(CH_2)_7.COOH$, or $CH_3.(CH_2)_5.CH(OSO_3Na).CH_2.-$
$CH=CH(CH_2)_7COOH$.

Example 3

5 kgms. dodecanol are mixed with 5 kgms. trichloroethylene and sulphonated at 50° C. with 3 kgms. of concentrated sulphuric acid. Into the warm sulphonation mixture finely ground guanidine is introduced in portions till the mixture shows a neutral reaction to methylorange. Excess solvent can be removed by filtering.

Example 4

5 kgms. of oleyl alcohol are mixed with 5 kgms. of ethyl ether and sulphonated with 3 kgms. chlorosulphonic acid at a temperature of 35° C. After removing the hydrochloric acid by introducing an inert gas, for example nitrogen, the mixture is neutralized by introducing urea in portions until a neutral reaction to methylorange is reached. The solvent can be removed by gentle heating under vacuum.

Other suitable organic bases, which can be employed, are for example betaine, thio-urea, chinoline, isochinoline, pyridine, piperidine and ethanolamines.

The pure salts of higher molecular alkyl sulphuric acids obtained in this way or their derivatives are in various respects of great technical importance. On the one hand their perfect purity renders them suitable for pharmaceutical use and on the other hand they can with advantage be employed in the textile and leather industries in metal treating and other industries wherever increase of wetting, emulsifying and foaming power is important, whereby in contrast to the known preparations hitherto used for these purposes, they are distinguished by the small amount of space they occupy, convenience of transportation and ease of application since they possess the active principles of many of these agents in a very pure form. Whereas, for example, in an ordinary Turkey red oil only about 25% of the total fatty acid is present in the form of the fatty acid-sulphuric acid ester salt, the solid ester salt preparations produced according to the new process are almost 100% pure, the same being free from all the easily decomposable diluents which occur in Turkey red oils, such as for example, fatty acid salts, which lower very considerably the acid and lime stability of these oil preparations.

By the term "bases" I include bases and their salts with weak acids, in solid, liquid or gaseous form, and it will be understood that the expression "anhydrous bases" as used herein refers only to such bases as are herein defined which are capable of neutralizing sulphation compounds in other words, those bases which form with the compounds comparatively stable salts.

This application is a continuation in part of applicant's copending application Serial No. 472,761, filed August 2, 1930.

The instant invention is particularly applicable to the treatment of normal straight-chain primary aliphatic alcohols having from 9 to 18 carbon atoms in the molecule, such for example, as lauryl, myristyl, cetyl and ricinoleyl alcohols, and mixtures of any two or more or all of the same.

I claim:

1. A process for the production of solid salts of a sulphated higher molecular aliphatic compound having more than nine carbon atoms, which consists in sulphating a higher molecular alkyl compound capable of forming an alkyl sulphate by reaction with a sulphating agent, neutralizing the sulphation product with an anhydrous base in the absence of water and alcohol.

2. A process for the production of solid salts of a sulphated higher molecular aliphatic compound having more than nine carbon atoms, which consists in sulphating a higher molecular alkyl compound capable of forming an alkyl sulphate by reaction with a sulphating agent, neutralizing the sulphation products with an anhydrous inorganic base in the absence of water and alcohol.

3. A process for the production of solid salts of a sulphated higher molecular aliphatic compound having more than nine carbon atoms which consists in sulphating a higher molecular alkyl compound capable of forming an alkyl sulphate by reaction with a sulphating agent with agents which produce no water during the sulphation, neutralizing the sulphation mixtures with an anhydrous base in the absence of water and alcohol.

4. A process for the production of solid salts of a sulphated higher molecular aliphatic compound having more than nine carbon atoms which consists in sulphating a higher molecular alkyl compound capable of forming an alkyl sulphate by reaction with a sulphating agent with agents which produce no water during the sulphation, neutralizing the sulphation mixtures with an anhydrous inorganic base in the absence of water and alcohol.

5. A process for the production of solid salts of a sulphated higher molecular aliphatic compound having more than nine carbon atoms, which consists in sulphating a higher molecular alkyl compound capable of forming an alkyl sulphate by reaction with a sulphating agent, neutralizing the sulphation mixtures with an anhydrous base in the absence of water and alcohol in the presence of inert solvents.

6. A process for the production of solid salts of a sulphated higher molecular aliphatic compound having more than nine carbon atoms, which consists in sulphating a higher molecular alkyl compound capable of forming an alkyl sulphate by reaction with a sulphating agent, neutralizing the sulphation mixtures with an anhydrous inorganic base in the absence of water and alcohol in the presence of inert solvents.

7. A process for the production of solid salts of a sulphated higher molecular aliphatic compound having more than nine carbon atoms, which consists in sulphating a higher molecular alkyl compound capable of forming an alkyl sulphate by reaction with a sulphating agent with agents which produce no water during the sulphation, neutralizing the sulphation mixtures with an anhydrous base in the absence of water and alcohol in the presence of inert solvents.

8. A process for the production of solid salts of a sulphated higher molecular aliphatic compound having more than nine carbon atoms which consists in sulphating a higher molecular alkyl compound capable of forming an alkyl sulphate by reaction with a sulphating agent with agents which produce no water during the sulphation, neutralizing the sulphation mixtures with an anhydrous inorganic base in the absence of water and alcohol in the presence of inert solvents.

9. The process comprising sulphating stearyl alcohol and neutralizing the sulphated product with an anhydrous base in the absence of water and alcohol whereby a solid salt is formed.

10. The process comprising sulphating ricinoleic acid and neutralizing the sulphated product with an anhydrous base in the absence of water and alcohol whereby a solid salt is formed.

11. A solid salt of a sulphated higher molecular aliphatic compound having more than nine carbon atoms, produced by sulphating a higher molecular alkyl compound capable of forming an alkyl sulphate by reaction with a sulphating agent and neutralizing the sulphated product with an anhydrous base in the absence of water and alcohol.

12. The process comprising sulphating a higher molecular alcohol having more than nine carbon atoms and neutralizing the sulphated product with anhydrous ammonia in the absence of water and alcohol.

13. As a new compound, an ammonium salt of a sulphated higher molecular alcohol having more than nine carbon atoms.

14. A process for the production of solid salts of sulphated higher molecular aliphatic compounds having more than nine carbon atoms which consists in sulphating a higher molecular alkyl compound capable of forming an alkyl sulphate by reaction with a sulphating agent and neutralizing the sulphated product with an anhydrous organic base in the absence of water and alcohol.

15. A process for the production of solid salts of alkyl sulphuric acids, comprising sulphating an aliphatic alcohol containing more than 9 carbon atoms, and neutralizing the resulting sulphuric ester mass with an anhydrous base in the absence of water and alcohol.

16. The process as described in claim 15 wherein the alcohol treated is a normal straight-chain primary aliphatic alcohol having from 9 to 18 carbon atoms.

17. The process as described in claim 15 wherein the alcohol treated is a normal straight-chain primary aliphatic alcohol having from 9 to 18 carbon atoms and wherein the base is an anhydrous inorganic base.

18. The process comprising sulphating stearyl alcohol and neutralizing the sulphated product with gaseous ammonia in the absence of water and alcohol, whereby a solid salt is formed.

19. A product suitable for finishing textiles consisting essentially of the ammonium salt of stearyl sulphuric acid ester.

20. The process of producing solid salts from sulphuric acid esters of higher molecular alcohols having more than 9 carbon atoms comprising neutralizing such an acid ester with an anhydrous base in the absence of water and alcohol.

21. The process comprising neutralizing sulphuric acid esters of higher molecular alcohols having from 9 to 18 carbon atoms in the presence of inert solvents of the nature described herein, with bases substantially free of water and alcohol.

22. The process comprising sulphating a higher molecular aliphatic alcohol having more than 9 carbon atoms and neutralizing with an anhydrous organic base substantially in the absence of water and alcohol whereby a solid organic salt is produced.

23. As a new compound, a solid organic salt of a sulphate of an aliphatic alcohol having more than 9 carbon atoms in the molecule.

HEINRICH BERTSCH.